United States Patent [19]

Pastorino et al.

[11] Patent Number: 4,692,427

[45] Date of Patent: Sep. 8, 1987

[54] DISPERSIONS AND THE PREPARATION OF FOAMED RESINS THEREFROM

[75] Inventors: Ronald L. Pastorino, San Anselmo; Lawrence A. Bock, Walnut Creek, both of Calif.

[73] Assignee: Witco Corporation, Richmond, Calif.

[21] Appl. No.: 934,734

[22] Filed: Nov. 25, 1986

[51] Int. Cl.$^4$ ............................................. C08J 9/08
[52] U.S. Cl. ................................ 502/160; 252/350; 521/69; 521/72; 521/84.1; 521/92; 521/96; 521/138
[58] Field of Search .................. 502/160; 252/350; 521/84.1, 96, 92, 69, 72, 138

[56] References Cited

U.S. PATENT DOCUMENTS

| | | | |
|---|---|---|---|
| 3,390,121 | 6/1968 | Burford et al. | 260/40 |
| 3,479,303 | 11/1969 | Wiescholleck | 260/2.5 |
| 4,016,112 | 4/1977 | Kajiura et al. | 260/2.5 |
| 4,028,289 | 6/1977 | Brown | 260/2.5 |
| 4,056,611 | 11/1977 | Young | 424/62 |
| 4,122,047 | 10/1978 | Filip et al. | 521/106 |
| 4,136,134 | 1/1979 | Plaisted | 502/160 |
| 4,233,204 | 11/1980 | Rubel | 502/160 |
| 4,255,277 | 3/1981 | Smearing | 502/160 |
| 4,347,331 | 8/1982 | Self | 521/119 |
| 4,355,028 | 10/1982 | Kligman et al. | 424/230 |
| 4,387,107 | 6/1983 | Klein et al. | 424/338 |
| 4,391,876 | 7/1983 | Tamosauskas et al. | 502/160 |
| 4,435,473 | 3/1984 | Tamosauskas et al. | 502/160 |
| 4,482,649 | 11/1984 | Miutel | 521/138 |
| 4,560,495 | 12/1985 | Kato | 502/160 |
| 4,600,727 | 7/1986 | Pastorino | 521/82 |

FOREIGN PATENT DOCUMENTS 2029834A  3/1980  United Kingdom .

Primary Examiner—Morton Foelak
Attorney, Agent, or Firm—Lockwood, Alex, FitzGibbon and Cummings

[57] ABSTRACT

A storage stable aqueous dispersion useful in the curing and foaming of unsaturated polyester resins containing an aromatic diacyl peroxide, an alkali metal carbonate or bicarbonate and dispersion-stabilizing amounts of magnesium aluminum silicate and an alkali metal carboxymethyl cellulose. Also disclosed is the preparation of foamed polyester resins using the dispersion.

14 Claims, No Drawings

DISPERSIONS AND THE PREPARATION OF FOAMED RESINS THEREFROM

BACKGROUND OF THE INVENTION

This invention relates to new compositions and to the preparation of foamed polyester resins. In particular, it relates to storage stable dispersions and their use in the curing and foaming of unsaturated polyester resins.

It is known in the art that aromatic diacyl peroxides can be used as polymerization initiators in the curing of unsaturated polyester resins (See, e.g. U.S. Pat. Nos. 4,016,112, 4,056,511 and 4,347,331).

It is also known in the art that unsaturated polyester resins can be foamed by the generation of $CO_2$ obtained from the decomposition of carbonates and bicarbonates (See, U.S. Pat. Nos. 3,479,303; 4,016,112; 4,028,289; 4,119,583; 4,122,047; 4,347,331 and British Pat. No. 2,029,834).

Prior attempts to combine the $CO_2$ generating material and the polymerization initiator into a readily useful, stable composition have not been successful.

It is therefore an object of the present invention to devise a system whereby the chemicals necessary for the curing of and foaming of an unsaturated polyester resin can be present in a readily useable, stable composition.

Other objects of this invention will become readily apparent from the ensuing description.

SUMMARY OF THE INVENTION

Unexpectedly it has been found possible to prepare storage stable compositions containing aromatic diacyl peroxides and alkali metal carbonates or bicarbonates. Previous attempts to prepare these mixtures failed since the components readily separated into aqueous and organic components by the addition of the carbonates or bicarbonates. This difficulty has now been solved by the use of sodium carboxymethyl cellulose (cellulose gum) in combination with magnesium aluminum silicate.

The new compositions of the present invention are aqueous dispersions containing the aromatic diacyl peroxide, an alkali metal carbonate or bicarbonate, water or mixtures thereof, magnesium aluminum silicate and alkali metal carboxymethyl cellulose. Being liquid they can be readily poured, pumped or sprayed into the system containing the unsaturated polyester resin. Furthermore, they are storage stable which is surprising since the addition of the carbonates or bicarbonates would be expected to separate the aqueous and organic phases. Also, other emulsifiers, dispersants, stabilizers, etc., can be added to enhance certain properties of the dispersion such as viscosity control and long term physical and chemical stability.

DETAILED DESCRIPTION

The amount of each component in the dispersion of the invention can be varied within suitable limits depending on the unsaturated polyester resin and monomer being reacted, the conditions of storage and other factors. Thus, the magnesium aluminum silicate and alkali metal carboxymethyl cellulose need be present in a dispersion stabilizing amount. The concentration of aromatic diacyl peroxide and alkali metal carbonate or bicarbonate can be varied depending on the unsaturated polyester resin being cured and foamed. In general, it has been found that the following amounts of the components are useful:

| COMPONENT | WEIGHT % |
|---|---|
| Aromatic Diacyl Peroxide | 2–25 |
| Alkali metal carbonate or bicarbonate | 10–30 |
| Magnesium aluminum silicate | 0.1–10 |
| Alkali metal carboxymethyl cellulose | 0.1–10 |
| Water | 50–85 |

The symmetrical or asymmetrical aromatic diacyl peroxides useful in this invention have the following structure:

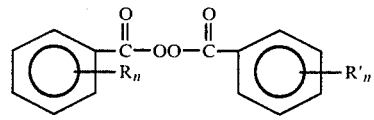

wherein $R_n$ has $R_n'$ are independently selected from the group consisting of hydrogen, methyl, ethyl, methoxy, ethoxy and halogen and m is an integer from 1–3.

Among the symmetrical or asymmetrical aromatic diacyl peroxides that can be used in the compositions of this invention are benzoyl, peroxide, bis o-toluoyl peroxide, bis(2,4-dichlorobenzoyl)peroxide, benzoyl o-toluoyl peroxide, benzoyl 2,4 dichlorobenzoyl peroxide, and o-toluoyl 2,4 dichlorobenzoyl peroxide, and mixtures thereof. Due to its availability and performance characteristics, benzoyl peroxide is a preferred polymerization initiator. It is conveniently added as a 70% wetted material, although it may be added as pure dry granules. Preferably, it is present in a quantity of from about 5 to about 20 weight percent of the dispersion.

The alkali metal carbonates and bicarbonates used in the dispersion, i.e., sodium carbonate, potassium carbonate, sodium bicarbonate and potassium bicarbonate, preferably constitute from about 10 to about 25 weight percent of the dispersion.

It is necessary that both the magnesium aluminum silicate and alkali metal carbonxymethyl cellulose be present in the dispersion in dispersion stabilizing amounts. Normally these components are each present in an amount of between about 0.1 and about 5 weight percent of the dispersion; it has been found that optimal results are obtained by the use of about 1.75 weight percent of each dispersion stabilizer.

Sufficient water need be present to form an aqueous dispersion. Normally the dispersion will contain at least about 55 weight percent water.

The aqueous dispersions of this invention can be prepared by standard procedures for the preparation of dispersions. Briefly, the alkali metal carboxymethyl cellulose is added to heated water, stirred and the magnesium aluminum silicate added to this mixture with stirring. After the mixture has been cooled to room temperature, the carbonate or bicarbonate is added with stirring, followed by addition of the aromatic diacyl peroxide with stirring continued. The desired dispersion can be obtained therefrom by passing this mixture through a homogenizer or other suitable mixing devices.

In order to demonstrate the stability of the aqueous dispersions of this invention the following experiments were performed. Example A details the general procedure used in the preparation of the dispersions and Tables 1-3 contain the results of the 29 Examples.

EXAMPLE A

Preparation of Dispersions

Water (140 grams) was placed in a beaker on a hot plate and heated with stirring to 60° C. The alkali metal carboxymethyl cellulose (4 g.) was added slowly to the water and stirred for about 10 minutes. Magnesium aluminum silicate (4 g.) was added slowly and the mixture was stirred at 60° C. for about 5 minutes. The carbonate or bicarbonate (25 g.) was added to the cooled mixture which was stirred for several minutes. Wetted benzoyl peroxide (32 g.; 70% pure) was then added and the mixture stirred for 30 minutes. Finally, the mixture was passed through a hand operated homogenizer. This product was then tested to determine its storage stability.

Results of Table 1 demonstrate the stability of the dispersion increases when sufficient amounts of both magnesium aluminum silicate and sodium carboxymethyl cellulose are incorporated into it. Results of Table 2 show stable dispersions can also be made with sodium bicarbonate and potassium carbonate. Results of Table 3 show stable dispersions can also be made with other aromatic diacyl peroxides besides benzoyl peroxide.

TABLE 1

STORAGE STABILITY OF DISPERSIONS CONTAINING POTASSIUM BICARBONATE

| | COMPONENTS (WEIGHT %) | | | | BENZOYL PEROXIDE | INITIAL VISCOSITY | TIME FOR SEPARATION OF DISPERSION | |
|---|---|---|---|---|---|---|---|---|
| EXAMPLE | $H_2O$ | Mg Al SILICATE[1] | CELLULOSE GUM[2] | $KHCO_3$ | (70% pure) | (CPS) | AMBIENT | 40° C. |
| 1 | 76.1 | | 2.2 | 16.3 | 5.4 | | Several hours | |
| 2 | 72.0 | 2.3 | | 15.4 | 10.3 | 2,200 | 1 day | 1 day |
| 3 | 63.7 | 1.1 | 1.1 | 22.7 | 11.4 | | 2 weeks | |
| 4 | 67.6 | 1.2 | 1.2 | 12.1 | 17.9 | 8,000 | about 1 mo. | |
| 5 | 59.6 | 1.7 | 1.7 | 21.3 | 15.7 | 6,600 | about 1 mo. | |
| 6 | 62.0 | 2.4 | 2.4 | 22.1 | 11.1 | | 16 weeks | |
| 7 | 66.0 | 1.9 | 2.8 | 14.2 | 15.1 | 13,000 | 50 days | 8 days |
| 8 | 72.2 | 3.6 | 3.6 | 15.5 | 5.1 | | 16 weeks | |

FOOTNOTE - TABLE 1
[1]Magnabrite HV from American Colloid Co.
[2]Sodium carboxymethyl cellulose Grade 7L from Hercules, Inc.

TABLE 2

STORAGE STABILITY OF DISPERSIONS CONTAINING OTHER BICARBONATE OR CARBONATE SALTS

| | COMPONENTS (WEIGHT %) | | | | BENZOYL PEROXIDE | INITIAL VISCOSITY | TIME FOR SEPARATION OF DISPERSION | |
|---|---|---|---|---|---|---|---|---|
| EXAMPLE | $H_2O$ | Mg Al SILICATE[1] | CELLULOSE GUM[2] | CARBONATE OR BICARBONATE | (70% pure) | (CPS) | AMBIENT | 40° C. |
| 9 | 67.6 | 1.2 | 1.2 | 12.1[3] | 17.9 | >20,000 | 82 days | |
| 10 | 59.6 | 1.7 | 1.7 | 21.3[3] | 15.7 | >20,000 | 82 days | |
| 11 | 68.2 | 2.0 | 2.0 | 12.2[3] | 15.6 | | 100 days | 12 day |
| 12 | 60.9 | 1.7 | 1.7 | 21.8[3] | 13.9 | 10,000 | 43 days | 6 days |
| 13 | 74.5 | 2.1 | 2.1 | 16.0[4] | 5.3 | | 1 week | |
| 14 | 58.3 | 1.7 | 1.7 | 25.0[4] | 13.3 | | 1 week | |
| 15 | 66.0 | 1.9 | 1.9 | 14.1[5] | 15.1 | 13,000 | 70 days | 24 days |
| 16 | 67.2 | 1.0 | 1.0 | 14.4[5] | 15.4 | 7,600 | 71 days | 23 days |

FOOTNOTES - TABLE 2
[1] and [2]See Table 1
[3]Sodium bicarbonate
[4]Potassium carbonate
[5]Potassium bicarbonate plus 1% cabosil

TABLE 3

STORAGE STABILITY OF DISPERSIONS CONTAINING OTHER AROMATIC DIACYL PEROXIDES

| | COMPONENTS (WEIGHT %) | | | | | | INITIAL VISCOSITY | TIME FOR SEPARATION OF DISPERSION AT AMBIENT |
|---|---|---|---|---|---|---|---|---|
| EXAMPLE | $H_2O$ | Mg Al SILICATE[1] | CELLULOSE GUM[2] | $KHCO_3$ | PEROXIDE (70% pure) | OTHER | (CPS) | |
| 17 | 68.0 | 1.9 | 1.9 | 12.1 | 16.1[3] | | 6,600 | >5 months |
| 18 | 60.6 | 1.7 | 1.7 | 21.7 | 14.3[3] | | 4,200 | about 4 months |
| 19 | 66.3 | 1.9 | 1.9 | 11.9 | 18.0[4] | | 10,200 | about 66 days |
| 20 | 59.3 | 1.7 | 1.7 | 21.2 | 16.1[4] | | 8,800 | about 34 days |
| 21 | 68.0 | 1.9 | 1.9 | 12.1 | 16.1[5] | | 13,000 | about 67 days |
| 22 | 60.6 | 1.7 | 1.7 | 21.7 | 14.3[5] | | 5,500 | 9 days |
| 23 | 67.3 | 1.9 | 1.9 | 12.0 | 16.9[6] | | 8,600 | about 65 days |
| 24 | 60.1 | 1.7 | 1.7 | 21.5 | 15.0[6] | | 7,200 | about 65 days |
| 25 | 60.9 | 1.7 | 1.7 | 21.8 | 13.9[7] | 0.5[8] | 4,700 | about 36 days |
| 26 | 60.7 | 1.5[10] | 0.25 | 25.0 | 12.0[7] | 0.65[8] | 500 | about 14 days |
| 27 | 60.8 | 1.5[10] | | 25.0 | 12.0[7] | 0.5[8] | 1,500 | about 22 days |
| 28 | 60.7 | 1.5[10] | | 25.0 | 12.0[7] | 0.25[9] | 900 | about 15 days |

TABLE 3-continued
STORAGE STABILITY OF DISPERSIONS CONTAINING OTHER AROMATIC DIACYL PEROXIDES

| EXAMPLE | COMPONENTS (WEIGHT %) | | | | | | INITIAL VISCOSITY (CPS) | TIME FOR SEPARATION OF DISPERSION AT AMBIENT |
|---|---|---|---|---|---|---|---|---|
| | H$_2$O | Mg Al SILICATE[1] | CELLULOSE GUM[2] | KHCO$_3$ | PEROXIDE (70% pure) | OTHER | | |
| 29 | 61.7 | 1.7 | 1.5 | 22.0 | 12.9[7] | 0.2[9] | 2,200 | 6 days |

FOOTNOTES - TABLE 3
[1] and [2]See Table 1
[3]Bis-o-toluoyl peroxide
[4]Bis(2,4-dichlorobenzoyl) peroxide
[5]Mixture of benzoyl peroxide, benzoyl o-toluoyl peroxide and bis o-toluoyl peroxide
[6]Mixture of benzoyl peroxide, benzoyl 2,4-dichlorobenzoyl peroxide, and bis 2,4-dichlorobenzoyl peroxide
[7]Wetted benzoyl peroxide with a solid plasticizer (BZF-70P)
[8]Nonionic polyalkoxylated butyl ether (WITCONAL NS108LQ)
[9]Nonionic alkanolamide (WITCAMIDE 5138)
[10]Attagel 50 from Engelhard In use the dispersions of this invention are added to conventional unsaturated polyester resin solutions containing monomer, suitable promoters and surfactants. Since the dispersion contains the polymerization initiator and the carbonate or bicarbonate source of the carbon dioxide gas for foaming the product, the curing and foaming of the unsaturated polyester resin can proceed by the one step addition of this new dispersion without the application of heat.

Polyester resins useful in this invention are disclosed in U.S. Pat. Nos. 3,390,112, 4,016,112 and 4,216,294. Typically, the unsaturated polyeser resin is preliminarily combined with a promoter, also as described in U.S. Pat. No. 4,216,294. Promoted unsaturated polyester resins, particularly aryl-amine promoted unsaturated polyester resins, are generally contemplated for use in the present invention. Tertiary amines are particularly effective promoters for aromatic diacyl peroxides.

Various other additives can also be present with the unsaturated polyester resin, particularly surfactants. For example, silicone surfactants have been used to insure entrapment and uniform dispersion of the gas. Typical silicone surfactants are disclosed in U.S. Pat. No. 4,216,294 and may be used in the present process.

Fillers, thixotropic agents, fire retardants, pigments, dyes, waxes, etc. and reinforcement agents such as glass fibers to modify properties and cost can also be incorporated into the polyester resin composition.

During the making of the foamed product, carbon dioxide gas is liberated from the carbonate or bicarbonate salt by reaction with a source of acid. Acid may be added to the reaction mixture for this purpose. Both inorganic and organic acids may be added to the reaction mixture. The amounts utilized will generally be similar to the amount of acid utilized in prior art processes employing carbon dioxide producing blowing agents. In the present process it is generally found that the polyester resin used in the process already contains sufficient acidic components to react with the carbonate or bicarbonate salt. Therefore, no additional acid will generally be required.

The most commonly used monomer for copolymerization is styrene. Consequently, the polyester resin solutions used in the examples reported in Table 4 contained styrene as the monomer; however, it is to be understood that the selection of the monomer is not critical to the present invention and that the disclosed dispersions can be used in systems containing other monomers such as methylmethacrylate, vinyltoluene, and diallylisophthalate.

The determination of the amount of dispersion necessary to prepare the desired foamed polyester product necessarily depends on the content of the aromatic diacyl peroxide in the dispersions. Normally the use of aromatic diacyl peroxide in an amount between about 0.5 to about 5 weight percent of the unsaturated polyester resin will suffice, although it is preferred that the amount be between about 1 to about 2 weight percent of the resin.

Thus the amount of dispersion to be used can be between about 2 and 50 weight percent of the unsaturated polyester resin; and preferably between about 4 and 20 weight percent of the resin.

In order to demonstrate the usefulness of the dispersions of this invention in the preparation of foamed polyester resins, the following experiments were performed. Example B contains the general procedure used in the experiments and Table 4 contains the details and results of the experiments.

EXAMPLE B

A master batch was prepared by adding Union Carbide L5340 silicone surfactant to the unsaturated polyester resin solution and mixing thoroughly. The promoters were added, first the cobalt naphthenate, if any, and then the amines. This mixture was thoroughly stirred and the acetic acid, if any, was added to it.

A portion of the master batch (50 grams) was placed into an 8 ounce cup. The dispersion was added and the system mixed by hand for about one minute. The amount of rise with time and the gel time were observed. After the foam was fully cured, it was removed from the cup and cooled for 24 hours. Then the density of the foam was determined by the water displacement method. The appearance of the finished cup foams was generally firm with a uniform cell structure.

Results of Table 4 demonstrate the utility of the claimed dispersions for making cured foams with uniform cell structure and densities ranging from about 12 lbs/ft$^3$ to about 33 lbs/ft$^3$.

TABLE 4
POLYESTER FOAMS PREPARED FROM DISPERSIONS

| EXAMPLE | POLYESTER RESIN | SURFACTANT (L-5340) (PHR) | PROMOTOR (PHR) | DISPERSION USED | | GEL TIME (MIN) | FOAM DENSITY | |
|---|---|---|---|---|---|---|---|---|
| | | | | (Ex. #) | (PHR) | | (g/cc) | lbs/ft$^3$ |
| 30 | Alpha 78-7OLV | 0.75 | (1) 0.10<br>(2) 0.15 | 4 | 20 | 3.8 | 0.37 | 23.1 |

TABLE 4-continued

POLYESTER FOAMS PREPARED FROM DISPERSIONS

| EXAMPLE | POLYESTER RESIN | SURFACTANT (L-5340) (PHR) | PROMOTOR (PHR) | DISPERSION USED (Ex. #) | (PHR) | GEL TIME (MIN) | FOAM DENSITY (g/cc) | lbs/ft³ |
|---|---|---|---|---|---|---|---|---|
| 31 | Alpha 78-7OLV | 0.75 | (3) 0.03 (1) 0.10 (2) 0.15 | 5 | 20 | 3.8 | 0.32 | 20.0 |
| 32 | Alpha 78-7OLV | 0.75 | (3) 0.03 (1) 0.10 (2) 0.15 | 5 | 15 | 8.0 | 0.34 | 21.2 |
| 33 | Alpha 78-7OLV | 0.75 | (3) 0.05 (1) 0.10 (2) 0.15 | 9 | 20 | 8.0 | 0.39 | 24.3 |
| 34 | Alpha 78-7OLV | 0.75 | (3) 0.03 (1) 0.10 (2) 0.15 | 10 | 20 | 9.0 | 0.36 | 22.5 |
| 35 | Cargill PE-8245 | 1.0 | (3) 0.03 (4) 0.15 | 5A | 15 | 5.0 | 0.44 | 27.5 |
| 36 | Cargill PE-8245 | 1.0 | (3) 0.15 (4) 0.15 | 5A | 15 | 4.8 | 0.41 0.53[7] | 25.6 33.1 |
| 37 | Koppers 1065-5 | 1.0 | (5) 0.15 (4) 0.15 | 5A | 20 | 6.5 | 0.49 | 30.6 |
| 38 | Koppers 1065-5 | 1.0 | (3) 0.15 (4) 0.15 | 5A | 15 | 7.8 | 0.49 | 30.6 |
| 39 | Corez 115-17 | 1.0 | (6) 0.5 (4) 0.15 | 5A | 15 | 5.8 | 0.34 | 21.2 |
| 40 | Corez 115-17 | 1.0 | (3) 0.15 (4) 0.15 | 5A | 20 | 3.5 | 0.33 | 20.6 |
| 41 | Corez 115-17 | 0.75 | (3) 0.15 (4) 0.10 | 5A | 15 | 8.0 | 0.37 | 23.1 |
| 42 | Corez 115-17 | 0.75 | (5) 0.10 (4) 0.10 | 5A | 15 | 8.5 | 0.37 | 23.1 |
| 43 | Corez 115-17 | 1.0 | (2) 0.10 (4) 0.10 | 5A | 15 | 6.5 | 0.40 0.51[7] | 25.0 31.8 |
| 44 | Corez 115-17 | 0.75 | (5) 0.10 (2) 0.20 (4) 0.10 | 5A | 20 | 4.5 | 0.30 0.44[7] | 18.7 27.5 |
| 45 | Corez 115-17 | 1.0 | (4) 0.15 (3) 0.15 | 14 | 20 | 3.0 | 0.34 | 21.2 |
| 46 | Alpha 78-7OLV | 0.75 | (6) 1.0 (1) 0.10 (2) 0.15 | 17 | 20 | 4.0 | 0.36 | 22.5 |
| 47 | Alpha 78-7OLV | 0.375 | (3) 0.03 (1) 0.05 (2) 0.075 | 20 | 20 | 0.4 | 0.25 | 15.6 |
| 48 | Alpha 78-7OLV | 0.375 | (3) 0.025 (1) 0.05 (2) 0.075 | 20 | 10 | 0.9 | 0.31 | 19.4 |
| 49 | Alpha 78-7OLV | 0.56 | (3) 0.025 (1) 0.12 (2) 0.06 | 20 | 15 | 0.7 | 0.24 | 15.0 |
| 50 | Alpha 78-7OLV | 0.75 | (1) 0.10 (2) 0.15 | 21 | 20 | 1.4 | 0.31 | 19.4 |
| 51 | Alpha 78-7OLV | 0.75 | (3) 0.03 (1) 0.10 (2) 0.15 | 23 | 20 | 2.3 | 0.33 | 20.6 |
| 52 | Alpha 78-7OLV | 0.75 | (3) 0.03 (1) 0.10 (2) 0.15 | 28 | 20 | 6.0 | 0.37 | 23.1 |
| 53 | Alpha 78-7OLV | 0.75 | (3) 0.05 (1) 0.16 (2) 0.15 | 28 | 28 | 7.0 | 0.39 | 24.3 |
| 54 C | Alpha 78-7OLV | 0.75 | (1) 0.10 (2) 0.15 | 29 | 10 | 10.0 | 0.34 | 21.1 |
| 55 | Alpha 78-7OLV | 0.75 | (3) 0.03 (1) 0.10 (2) 0.15 | 29 | 20 | 5.5 | 0.30 | 18.7 |
| 56 | Alpha 78-7OLV | 0.75 | (3) 0.03 (1) 0.10 (2) 0.15 | 29 | 20 | 6.5 | 0.19[8] | 11.9 |
| 57 | Cargill PE-8245 | 0.75 | (3) 0.03 (2) 0.30 | 26 | 20 | 7.4 | 0.47 | 29.3 |

TABLE 4-continued

| | | POLYESTER FOAMS PREPARED FROM DISPERSIONS | | | | | | |
|---|---|---|---|---|---|---|---|---|
| | | SURFACTANT | | | | GEL | | |
| | POLYESTER | (L-5340) | PROMOTOR | DISPERSION USED | | TIME | FOAM DENSITY | |
| EXAMPLE | RESIN | (PHR) | (PHR) | (Ex. #) | (PHR) | (MIN) | (g/cc) | lbs/ft³ |
| 58 | Cargill PE-8245 | 0.75 | (2) 0.30 | 27 | 20 | 7.0 | 0.49 | 30.6 |

FOOTNOTES - TABLE 4
[1]6% cobalt naphthenate solution
[2]Ethyl phenyl ethanol amine
[3]Dimethyl analine
[4]Dimethyl-p-toluidine
[5]Methyl phenyl ethanol amine
[6]Acetic acid
[7]Thinner can lid casting
[8]15 seconds mix, rather than 1 minute

We claim:

1. An aqueous dispersion for use in foaming and curing polyester resins comprising a symmetrical or asymmetrical aromatic diacyl peroxide; an alkali metal carbonate or bicarbonate or mixtures thereof; a dispersion stabilizing amount of magnesium aluminum silicate and alkali metal carboxymethyl cellulose; and sufficient water to form an aqueous dispersion.

2. The aqueous dispersion of claim 1 wherein the symmetrical or asymmetrical aromatic diacyl peroxide has the following structure:

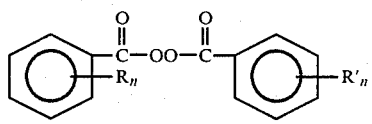

wherein $R_n$ and $R'_n$ are independently selected from the group consisting of hydrogen, methyl, ethyl, methoxy, ethoxy and halogen and n is an integer from 1-3.

3. The aqueous dispersion of claim 2 wherein the symmetrical or asymmetrical aromatic diacyl peroxide is benzoyl peroxide, bis-o-toluoyl peroxide, bis 2,4-dichlorobenzoyl peroxide, benzoyl o-toluoyl peroxide, benzoyl 2,4-dichlorobenzoyl peroxide, or o-toluoyl 2,4-dichlorobenzoyl peroxide and mixtures thereof.

4. The aqueous dispersion of claim 3 wherein the alkali metal carbonate or bicarbonate is potassium bicarbonate.

5. The aqueous dispersion of claim 3 wherein the alkali metal carbonate or bicarbonate is sodium bicarbonate.

6. The aqueous dispersion of claim 3 wherein the alkali metal carbonate or bicarbonate is potassium carbonate.

7. The aqueous dispersion of claim 3 wherein the alkali metal carbonate or bicarbonate is sodium carbonate.

8. The aqueous dispersion of claim 3 wherein the symmetrical or asymmetrical aromatic diacyl peroxide is benzoyl peroxide.

9. The aqueous dispersion of claim 3 wherein the symmetrical or asymmetrical aromatic diacyl peroxide is present in an amount of about 2 to about 25 weight percent of the dispersion.

10. The aqueous dispersion of claim 3 wherein the benzoyl peroxide is present in an amount of from about 5 to about 25 weight percent of the dispersion.

11. The aqueous dispersion of claim 4 wherein the potassium bicarbonate is present in an amount of from about 10 to about 30 weight percent of the dispersion.

12. The aqueous dispersion of claim 5 wherein the sodium bicarbonate is present in an amount of from about 10 to about 30 weight percent of the dispersion.

13. The aqueous dispersion of claim 4 wherein the alkali metal carboxymethyl cellulose is sodium carboxymethyl cellulose.

14. The aqueous dispersion of claim 13 wherein the magnesium aluminum silicate and sodium carboxymethyl cellulose are each present in an amount between about 0.10 and about 10 weight percent of the dispersion.

* * * * *